United States Patent
French et al.

(10) Patent No.: US 9,163,410 B2
(45) Date of Patent: Oct. 20, 2015

(54) SINGLE PLY ROOFING MEMBRANES WITH MULTIFUNCTIONAL BIODEGRADABLE RELEASE LINER

(71) Applicant: Carlisle Intangible Company, Syracuse, NY (US)

(72) Inventors: David French, Carlisle, PA (US); Anil Shenoy, Mechanicsburg, PA (US)

(73) Assignee: Carlisle Intangible Company, Syracuse, NY (US)

(*) Notice: Subject to any disclaimer, the term of this patent is extended or adjusted under 35 U.S.C. 154(b) by 0 days.

(21) Appl. No.: 14/341,871

(22) Filed: Jul. 28, 2014

(65) Prior Publication Data

US 2014/0345230 A1    Nov. 27, 2014

Related U.S. Application Data

(62) Division of application No. 13/440,415, filed on Apr. 5, 2012, now Pat. No. 8,833,037.

(51) Int. Cl.

| | |
|---|---|
| E04D 15/02 | (2006.01) |
| E04D 5/10 | (2006.01) |
| E04D 15/06 | (2006.01) |
| B32B 7/06 | (2006.01) |
| B32B 7/12 | (2006.01) |
| B32B 25/00 | (2006.01) |
| B32B 27/30 | (2006.01) |
| B32B 27/32 | (2006.01) |
| B32B 3/04 | (2006.01) |
| E04D 5/06 | (2006.01) |

(52) U.S. Cl.
CPC . *E04D 15/02* (2013.01); *B32B 3/04* (2013.01); *B32B 7/06* (2013.01); *B32B 7/12* (2013.01); *B32B 25/00* (2013.01); *B32B 27/304* (2013.01); *B32B 27/32* (2013.01); *E04D 5/06* (2013.01); *E04D 5/10* (2013.01); *E04D 15/06* (2013.01); *B32B 2307/402* (2013.01); *B32B 2307/716* (2013.01); *B32B 2307/7163* (2013.01); *B32B 2307/748* (2013.01); *B32B 2419/06* (2013.01); *Y10T 428/15* (2015.01); *Y10T 428/19* (2015.01); *Y10T 428/24752* (2015.01); *Y10T 428/31855* (2015.04); *Y10T 428/31931* (2015.04); *Y10T 428/31935* (2015.04); *Y10T 428/31938* (2015.04)

(58) Field of Classification Search
CPC .......... B32B 5/18; B32B 27/40; B32B 27/32; B32B 2419/06; E04D 5/12
USPC .............. 52/408, 409, 411, 746.11; 428/42.3, 428/40.1, 42.2
See application file for complete search history.

(56) References Cited

U.S. PATENT DOCUMENTS 3,358,355 A * 12/1967 Youssi et al. .................... 29/424
4,386,981 A *  6/1983 Clapperton ..................... 156/71

(Continued)

*Primary Examiner* — Brian Glessner
*Assistant Examiner* — Paola Agudelo
(74) *Attorney, Agent, or Firm* — Wood, Herron & Evans, LLP

(57) ABSTRACT

A roofing laminate includes a roofing membrane, preferably a white roofing membrane, which is covered with a protective sheet. The protective sheet is tinted so that it has a coloration distinguishable from the roofing. The roofing laminate is applied to a roof surface and the release liner protects the outer surface of the membrane from scrapes and dirt during installation. Once the roof is installed the protective sheets are removed from all of the membrane sheets, exposing a clean surface.

8 Claims, 4 Drawing Sheets

(56) References Cited

U.S. PATENT DOCUMENTS

| | | | | |
|---|---|---|---|---|
| 4,584,220 A | * | 4/1986 | Melbye | 428/42.3 |
| 4,757,652 A | * | 7/1988 | Kalkanoglu | 52/420 |
| 5,070,122 A | * | 12/1991 | Vanderbilt et al. | 524/47 |
| 5,135,966 A | * | 8/1992 | Chatterjee et al. | 523/126 |
| 5,142,837 A | * | 9/1992 | Simpson et al. | 52/409 |
| 5,749,994 A | * | 5/1998 | Sundet | 156/230 |
| 2007/0054129 A1 | * | 3/2007 | Kalkanoglu et al. | 428/413 |
| 2009/0320383 A1 | * | 12/2009 | Taylor et al. | 52/90.1 |

\* cited by examiner

SINGLE PLY ROOFING MEMBRANES WITH MULTIFUNCTIONAL BIODEGRADABLE RELEASE LINER

RELATED APPLICATIONS

This application is a divisional application of U.S. patent application Ser. No. 13/440,415 filed Apr. 5, 2012, said application being herewith expressly incorporated herein by reference.

BACKGROUND OF THE INVENTION

Membrane roofs are roofs that are covered with a polymeric sheet or membrane. These polymeric sheets can be, for example, polyvinyl chloride (PVC), thermoplastic olefin (TPO), or ethylene propylene diene monomer rubber (EPDM), as well as many others. The polymeric sheet is positioned over a roof surface and held in place by fasteners, adhesive, or ballast. Adjacent sheets are bonded together along lap seams to form a unitary single sheet of the polymer covering the entire roof.

Generally, the roofing membrane is either white or black. Theoretically, the membranes could be basically any color.

One chooses a white membrane roof for either aesthetic purposes or to reduce energy costs by reflecting thermal energy. In either event, it is important that the white membrane roof sheeting be clean, i.e., white, subsequent to installation or it will not provide the aesthetic appearance desired nor have the same reflective properties.

Particularly, when replacing an existing roof, it is difficult to keep the new sheeting clean. In a re-roofing application, a section of the old roof covering is removed and new roof membrane is immediately installed in its place. This allows the roof to be fully covered each night. As subsequent sections of the old roof are removed, the roofers walk on the previously installed new membrane. This can scratch and mar the new membrane. Even when installing a new roof, it is difficult to keep the white membrane clean during installation.

SUMMARY OF THE INVENTION

The present invention is premised on the realization that during installation of a single-ply roofing membrane, the surface of the membrane can be protected from dirt, scratches and scrapes by providing a removable tinted or colored release liner adhered to the membrane. The release liner is left in place during installation of the white membrane roof sheeting and be removed after completion of the installation. The tinting or coloration on the release liner ensures that the release sheet is noticeable and not inadvertently left on the roof. Further, the release liner can be formed from an environmentally degradable polymer so that even if some portions of the release sheet remain on the roof, they will degrade quickly and basically wash off the roof.

The objects and advantages of the present invention will be further appreciated in light of the following detailed description and drawings in which:

DETAILED DESCRIPTION

Figure 1:
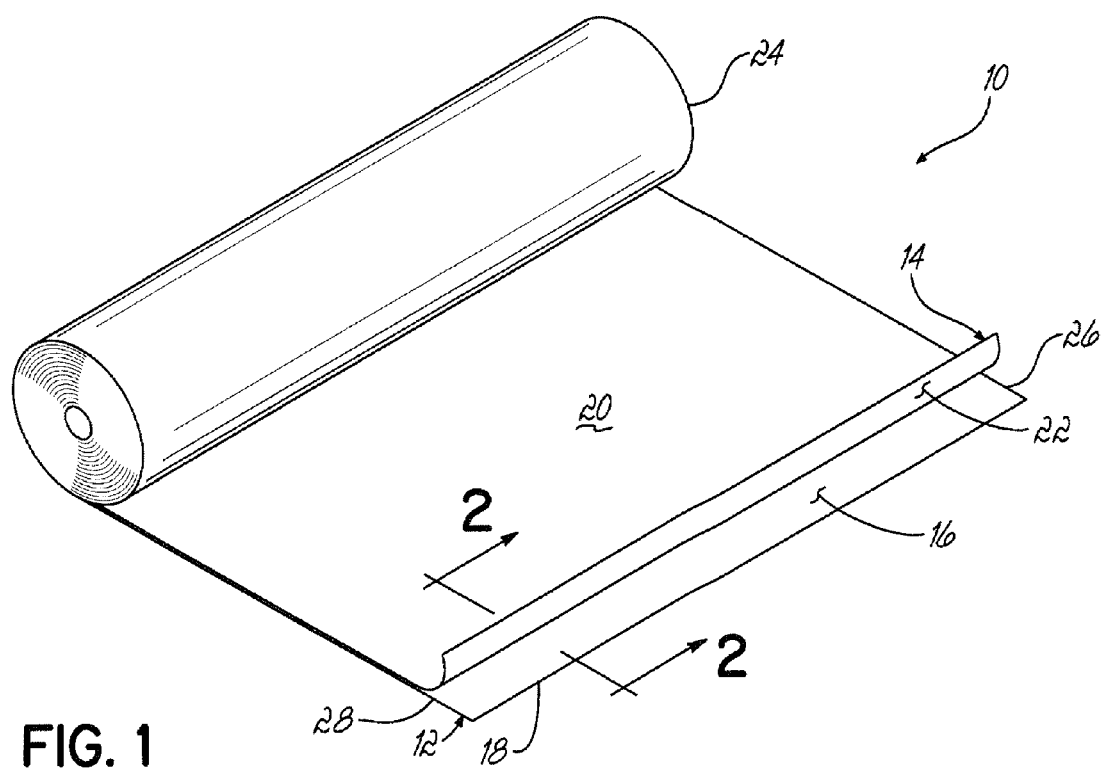
FIG. 1 is a perspective view of the present invention.
Figure 2:
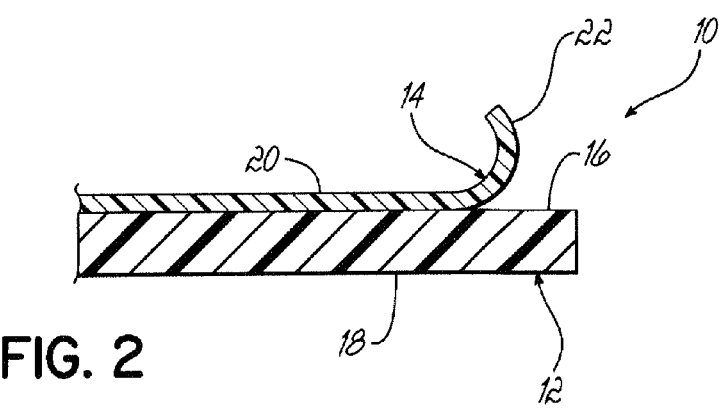
FIG. 2 is a cross sectional view taken at lines 2-2 of FIG. 1.

The present invention is a roof laminate 10 that includes a roof membrane 12 and a release sheet or protective sheet 14. The roof membrane 10 includes a first surface 16 and a second surface 18, and, likewise, the release sheet 14 includes a first surface 20 and a second surface 22 which rests on and covers the first surface 16 of membrane 12.

Membrane 12 can be formed from any polymer typically used in roofing applications. These include polyvinyl chloride, thermoplastic olefin, ethylene propylene diene monomer rubber polyethylene polyolefin, as well as others. The membrane can have a bottom fibrous surface referred to as fleeceback, which improves bond strength in a fully adhered system. The membrane 12 is preferably white or slightly off-white. It can be any color. The present invention is most useful when the membrane is a lighter color, such as white or off-white, and is least advantageous when the membrane is black. Although theoretically one may want to incorporate a protective covering over a black sheeting for use in the present invention.

Membrane 12 can be any typical size. These can be as narrow as 5 feet and as wide as 40 feet. Length can be 50-100 feet or more. Membrane 12 has a thickness effective for use in a membrane roof system. Generally, these will be 20 to about 160 mils thick. Roofing membranes are water insoluble and designed to withstand environmental conditions for at least 15 to 20 years.

The protective sheet 14 is a thin polymeric sheet which can be formed from a variety of different polymers. Although the protective sheet can be clear, it is preferable that it be tinted with a color that is distinguishable from the color of the membrane 12. Thus, if the membrane 12 is white, the protective sheet 14 is preferably any color other than clear or white, such as green, red blue or yellow.

Preferably, the protective sheet 14 is formed from an environmentally degradable polymer. Exemplary environmentally degradable polymers include polyhydroxyalkanoates such as those disclosed in U.S. Pat. No. 5,070,122, polylactic acid and copolymers of polylactic acid and ethylene carbon-monoxide copolymers as disclosed in U.S. Pat. No. 5,135,966. These polymers break down over a period of time, preferably less than a month when exposed to certain environmental conditions, such as sunlight, heat or moisture, or a combination of any of these. Preferably, these environmentally degradable membranes will break down in a matter of days.

The roofing laminate 10 is formed by separately forming the roofing membrane 12 and the protective sheet 14, and laminating the two together. If the protective sheet 14 includes an adhesive layer, this can be formed by co-extruding a pressure sensitive adhesive along with the membrane, or subsequently coating the formed membrane with a pressure sensitive adhesive, in particular a thermoplastic pressure sensitive adhesive. The protective sheet can also be made naturally adherent to the membrane by incorporating tackifiers into the protective sheet and applying the protective sheet to the membrane in a slightly stretched condition which liberates tackifier. The exposed tackifier provides weak adhesion of the protective sheet to the membrane. Once the protective sheet 14 is laminated to the membrane, the laminate 10 is formed into a roll 24.

Figure 3:
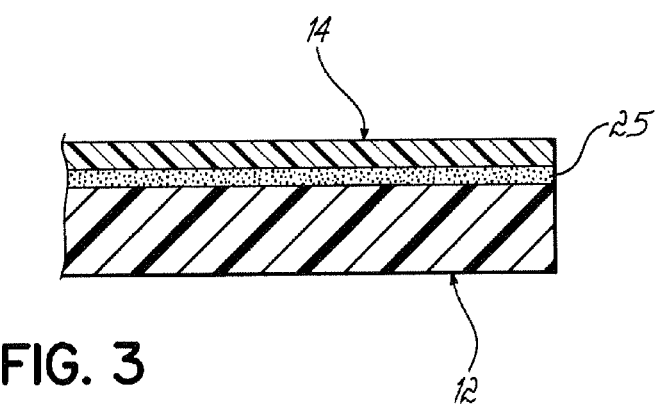
FIG. 3 is a cross sectional view of an alternate embodiment of the present invention.
Figure 4:
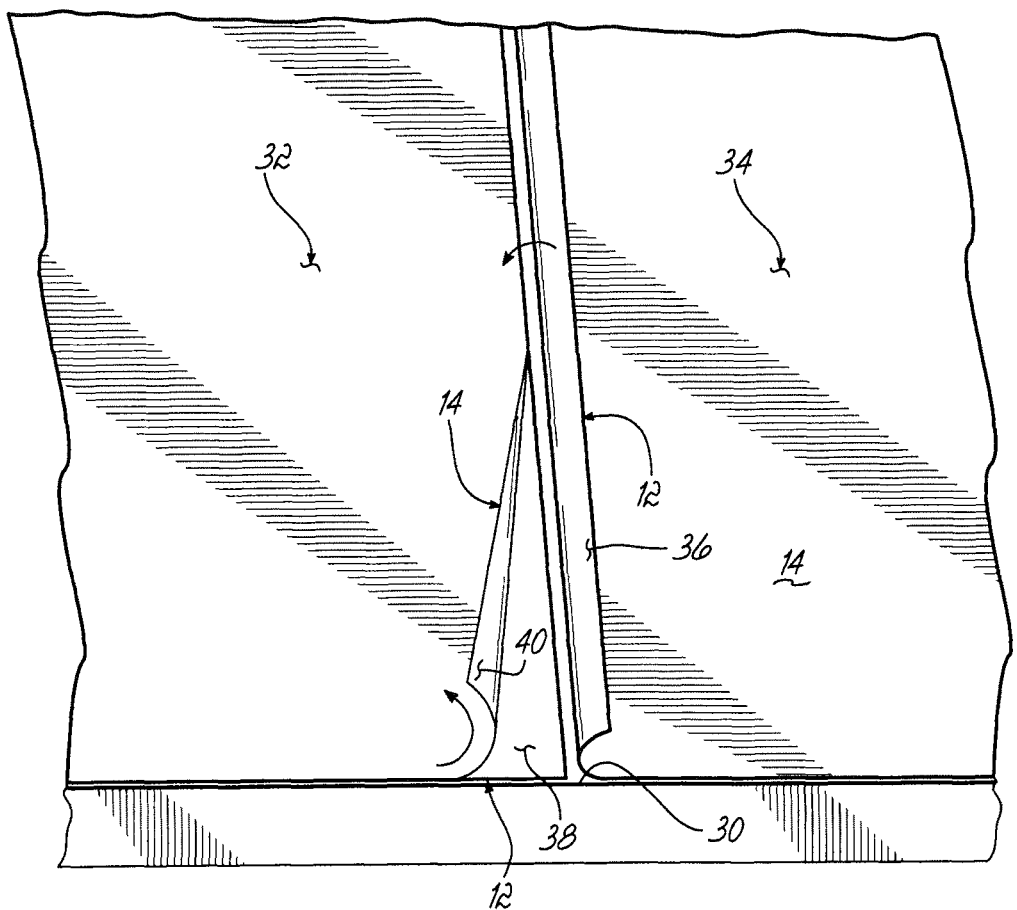
FIG. 4 is a perspective view of the present invention during installation.

Alternately, as shown in FIG. 3, a thin layer of adhesive 25 may be applied between the first surface of the membrane 12 and second surface of the protective sheet 14 to adhere the two together. The adhesive should be clear and have a preferable adherence to the protective sheet 14 as opposed to the membrane 12. A water soluble adhesive is preferred so that if any remains on the membrane 12 after removing the protective sheet it will wash away.

To apply the membrane 12 over a roof surface 30, two adjacent sheets 32 and 34 of the roofing laminate 10 are laid down side by side over the roof surface 30. The membrane 12 of laminate 32 is fixed to the roof, generally using adhesives (not shown). However, other methods such as mechanically fastening the membrane to the roof can be employed. Second sheet 34 of roofing laminate 10 is rolled out and adhered to the roof surface adjacent the first sheet 32 with edge 36 of the second sheet 34 overlapping edge 38 of the first sheet 32. The overlapping edges 36 and 38 are adhered or welded to each other.

Figure 5:
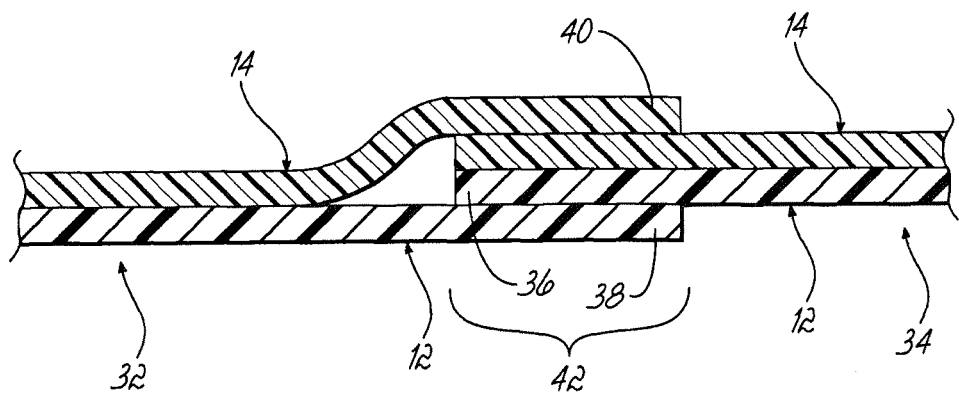
FIG. 5 is a cross sectional view of an edge portion of the present invention during installation and prior to removal of the release sheet.

With the embodiment shown in FIG. 1, the edge portion 40 of the protective sheet 14 on the first laminate 32 is pulled up enough to allow the edge 36 of the second membrane sheet to overlap the exposed edge 38 of the first membrane 32. The two edges 36 and 38 are then bonded together by heat or adhesive. As shown in FIG. 5, the edge portion 40 of the protective sheet from the first laminate sheet 32 is then folded back and rests over the overlapped portion 42 of the two membranes 12,12.

Figure 8:
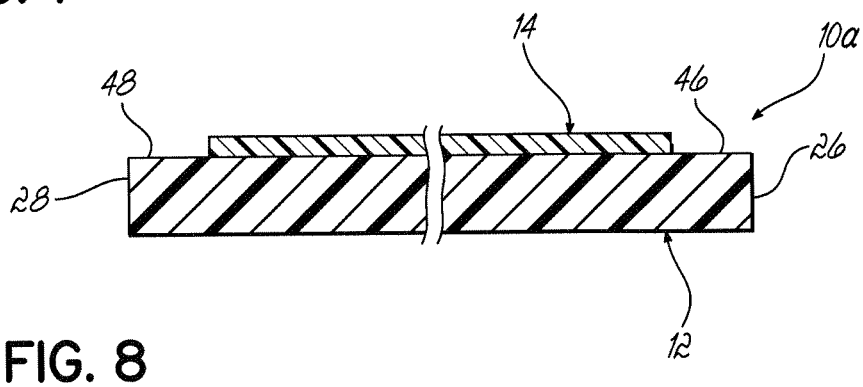
FIG. 8 is a cross sectional view partially broken away of a second alternate embodiment of the present invention.

As shown in FIG. 1, the protective sheet 14 covers the entire membrane 12 from side to side. However, as shown in FIG. 8, the protective sheet 14 may cover the entire membrane except for 4- to 12-inch portions on either edges 26 and 28 of the laminate 10.

Figure 9:
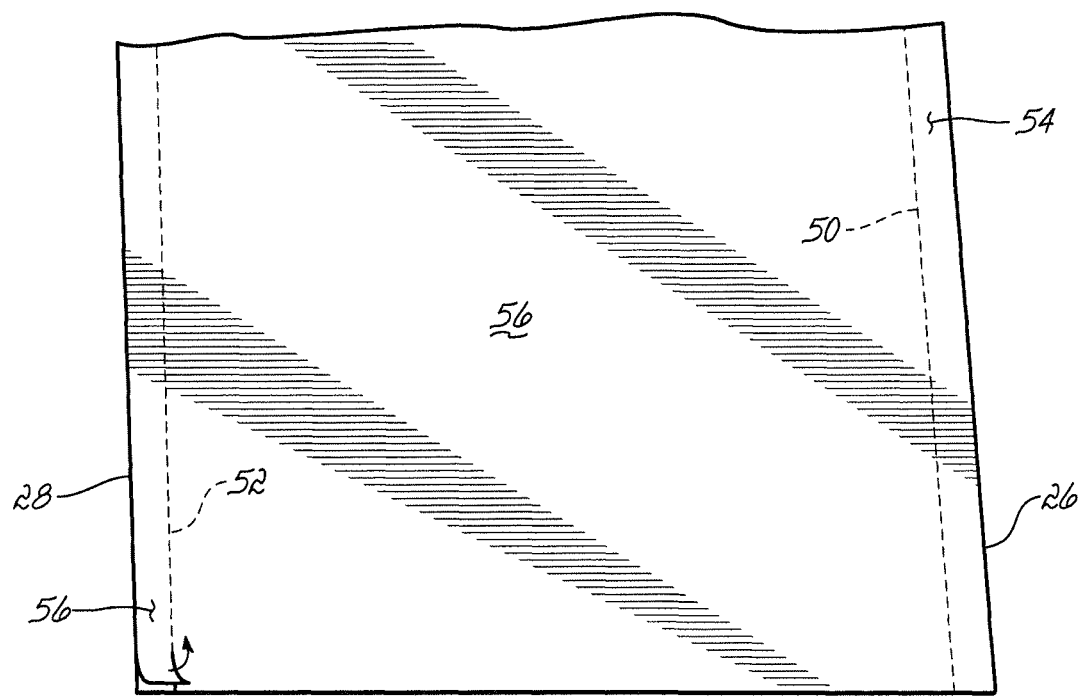
FIG. 9 is a perspective view of a third alternate embodiment of the present invention.

Alternately, as shown in FIG. 9, the protective sheet 14 can include perforations 50,52 along side edges 26 and 28, which allow strips 54 and 56 to be removed from the sheet leaving the field portion 56 of the protective sheet protecting the membrane. Either of these embodiments allow adjacent sheets of membrane to be bonded together while either the field portion, as in FIG. 9, or the entire sheet, as in FIG. 8, remain on the membrane 12.

Once the roof is fully installed, all of the protective sheets are pulled away from the membrane leaving an exposed white or colored membrane surface free of scratches and dirt. In the event a protective sheet or a portion of a protective sheet is inadvertently left on the roof, sunlight and water will cause it to disintegrate and wash away.

Figure 6:
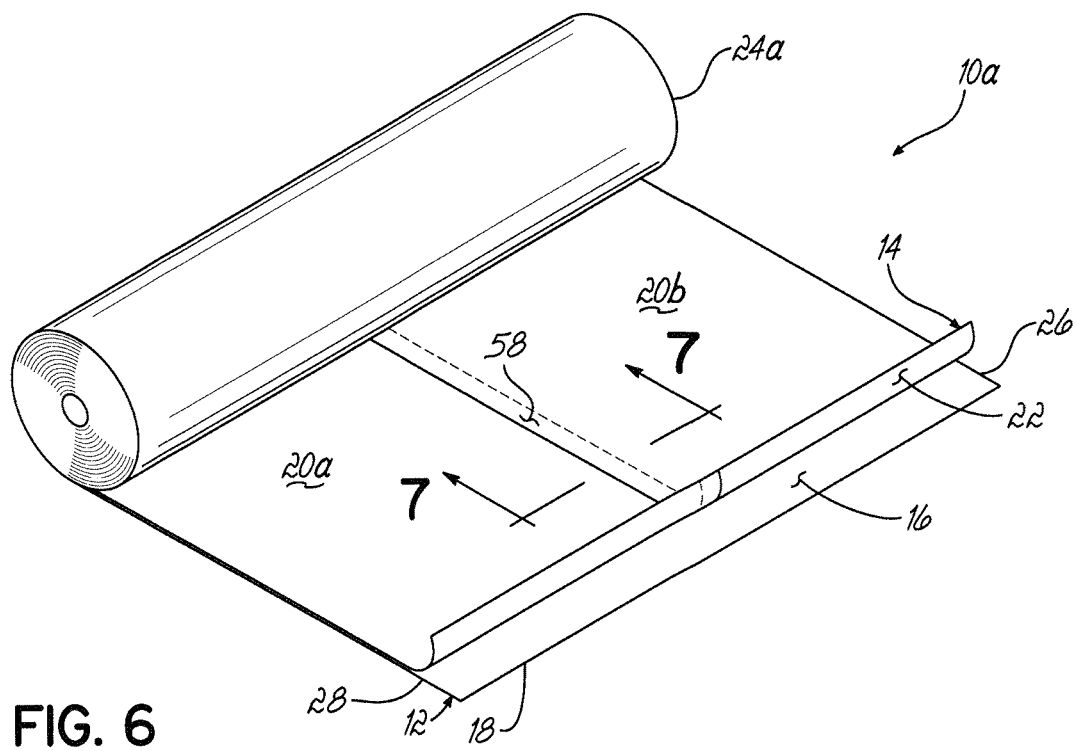
FIG. 6 is a perspective view of an alternate embodiment of the present invention.
Figure 7:
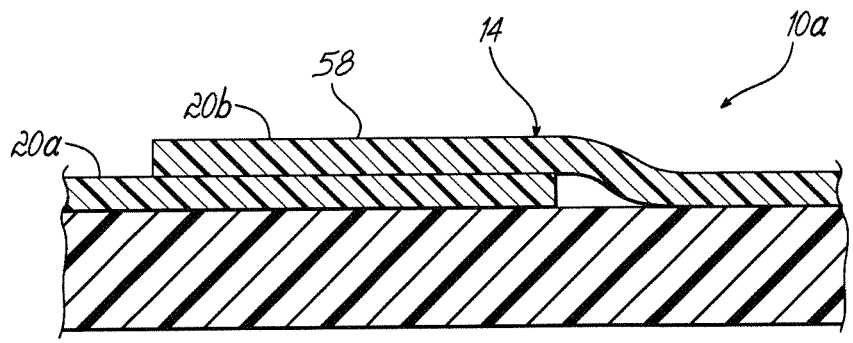
FIG. 7 is a cross sectional view broken away taken at line 7-7 of FIG. 6.

An alternate embodiment of the present invention is shown in FIG. 6 wherein two protective sheets 20A and 20B protect the membrane 12. Sheets 20A and 20B overlap in the central portion of the membrane. The overlapped portion 58 lies loose on the membrane 12. The loose overlapped portions 58 can be easily pulled up, allowing one to remove both protective sheets 20A and 20B.

This has been a description of the present invention along with the preferred method of practicing the present invention. However, the invention itself should only be defined by the appended claims, WHEREIN WE CLAIM:

What is claimed is:

1. A roofing laminate comprising a roofing membrane and a protective sheet removably affixed directly to a first surface of said membrane wherein said protective sheet is environmentally degradable, and wherein said roofing membrane is formed from a polymer selected from the group consisting of EPDM, PVC and TPO and has a thickness of 40-160 mils, and wherein said protective sheet is affixed to said first surface by a thin layer of water soluble adhesive.

2. The roofing laminate claimed in claim 1 wherein said membrane is white.

3. The roofing laminate claimed in claim 2 wherein said protective sheet has a color distinguishable from said white sheet.

4. The roofing laminate claimed in claim 1 wherein said adhesive adheres to said protective sheet when said protective sheet is separated from said membrane.

5. The roofing laminate claimed in claim 1 wherein said protective sheet has a first sheet and a second sheet covering said roofing membrane wherein said first sheet and second sheet are overlapped along a central portion of said membrane.

6. The roofing laminate claimed in claim 1 wherein said protective sheet includes first and second perforations along first and second edges of said protective sheet.

7. The roofing laminate claimed in claim 1 wherein said protective sheet does not cover first and second edge portions of said roofing membrane.

8. A roofing laminate comprising:
- a polymeric membrane sheet selected from the group consisting of EPDM, PVC and TPO and having a thickness of 40-160 mils and having an upper surface; and
- a protective sheet adhered to said upper surface with an adhesive wherein said protective sheet is adhered to said upper surface by a thin layer of water soluble adhesive, wherein said adhesive adheres to said protective sheet when said protective sheet is separated from said membrane.

* * * * *